(12) United States Patent
Dietrich et al.

(10) Patent No.: US 8,322,237 B2
(45) Date of Patent: Dec. 4, 2012

(54) COUPLING FOR A POSITION INDICATION DEVICE

(75) Inventors: Brent Allan Dietrich, Fort Collins, CO (US); Peter Damion Bells, Carson City, NY (US); Ivan James Hansen, Loveland, CO (US); Paul Nathan Manzano, Gardnerville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/044,971

(22) Filed: Mar. 10, 2011

(65) Prior Publication Data

US 2012/0227517 A1   Sep. 13, 2012

(51) Int. Cl.
*G01D 7/02* (2006.01)
(52) U.S. Cl. ...................................... 73/866.1
(58) Field of Classification Search .............. None
See application file for complete search history.

(56) References Cited

U.S. PATENT DOCUMENTS

| | | | |
|---|---|---|---|
| 5,492,456 A * | 2/1996 | Knight et al. | 417/360 |
| 6,311,566 B1 | 11/2001 | Ferguson | |
| 7,296,487 B2 | 11/2007 | Mayer et al. | |
| 7,878,448 B2 * | 2/2011 | Olsen et al. | 244/54 |
| 2004/0113114 A1 * | 6/2004 | Kerger et al. | 251/160 |
| 2010/0040315 A1 * | 2/2010 | Ozaki et al. | 384/446 |

OTHER PUBLICATIONS

ITT Enidine Internet web page: http://www.enidine-aviation.com/rodmain.html; "Elastomeric Rod Ends"; Mar. 9, 2011, 2 pages.

* cited by examiner

*Primary Examiner* — Robert R Raevis
(74) *Attorney, Agent, or Firm* — Armstrong Teasdale LLP

(57) ABSTRACT

A bearing device for coupling a position indication device to an apparatus for measuring a position of the apparatus is described. The apparatus includes a first connecting member. The bearing device includes a bearing housing including a first opening defined therein configured to receive the first connecting member and a second opening defined therein configured to receive at least a portion of the position indication device. The bearing device also includes a grommet configured for positioning within the first opening and for positioning around the first connecting member.

19 Claims, 4 Drawing Sheets

COUPLING FOR A POSITION INDICATION DEVICE

BACKGROUND OF THE INVENTION

The embodiments described herein relate generally to a position indication system, and more specifically, to a vibration tolerant bearing mechanism for use in a position indication system.

Closed loop control of a linear actuator typically requires an accurate sensed position feedback signal. Linear actuators are included in many residential and commercial applications. For example, positions of valves included within a steam turbine may be adjusted using linear actuators. Furthermore, a position of the valve may be measured using a position indication device, for example, a linear variable differential transformer (LVDT). A steam valve position indication system may utilize a stud coupled to the steam valve in combination with a rod end bearing arrangement to secure a linear transducer rod of the LVDT to the steam valve. The rod end bearing arrangement may include a bearing ball and a bearing housing.

Significant vibration levels encountered on large steam turbine valves may cause severe wear to the rod end bearing arrangement, for example, between the bearing ball and the bearing housing. The severity of the wear may allow the rod end bearing housing to disconnect from the bearing ball. The degrees of freedom of the rod end bearing arrangement also may allow for significant rotational vibration about the axis of the linear transducer rod, which contributes to increased wear. This wear may occur on both metal-on-metal greased rod end bearing arrangements and non-greased rod end bearing arrangements. Furthermore, a bearing ball liner, for example, a Teflon® weave liner between the bearing ball and the bearing housing, does not prevent such wear. Teflon® is a registered trademark of E. I. du Pont de Nemours and Company. Moreover, the liner may become deformed due to excessive vibration, resulting in excessive clearance between the bearing ball and the bearing housing.

Wear to the rod end bearing arrangement may result in insecure coupling of the rod end bearing arrangement and the stud. This allows relative motion to occur between the metal stud and metal rod end bearing housing. The relative motion may result in fretting wear of the stud, and ultimately, to failure of the stud. The relative motion may also result in a noisy feedback signal from LVDT to the control system.

To increase the useful life of the position indication system, the rod end bearing arrangement may be greased and/or materials used to form the bearing ball and the bearing housing may be varied. For example, elastomeric rod end bearing arrangements are commercially available, however, characteristics of a typical elastomeric rod end bearing arrangement are not adjustable based on a preload compression level.

BRIEF DESCRIPTION OF THE INVENTION

In one aspect, a position indication system for measuring a position of an apparatus is provided. The system includes a bracket coupled to the apparatus and including a first connecting member. The system also includes a position indication device including a second connecting member. The system also includes a bearing device configured to couple the first connecting member to the second connecting member. The bearing device includes a bearing housing that includes a first opening defined therein. The bearing device also includes a grommet that includes a second opening defined therein. The grommet is configured for positioning within the first opening, the first member configured to extend through the second opening and to couple the bearing device to the bracket.

In another aspect, a bearing device for coupling a position indication device to an apparatus for measuring a position of the apparatus is provided. The apparatus includes a first connecting member. The bearing device includes a bearing housing that includes a first opening defined therein configured to receive the first connecting member and a second opening defined therein configured to receive at least a portion of the position indication device. The bearing device also includes a grommet configured for positioning within the first opening and for positioning around the first connecting member.

In yet another aspect, a method for coupling an apparatus to a position indication device using a bearing device is provided. The apparatus includes a cantilevered stud extending from the apparatus configured to interact with a cooperating member. The bearing device includes a bearing housing and a grommet. The bearing housing includes a bearing housing opening defined therein and the grommet includes a grommet opening defined therein. The method includes configuring the grommet and the bearing housing to receive the cantilevered stud, wherein the grommet is positioned between the cantilevered stud and the bearing housing. The method also includes configuring the cooperating member and the cantilevered stud to apply a compression force on the grommet.

DETAILED DESCRIPTION OF THE INVENTION

The methods, systems, and devices described herein facilitate coupling a position indication device to an apparatus using a bearing device in a manner that allows for proper alignment of the position indication device and the apparatus. Proper alignment facilitates accurate operation of the position indication device and reduced wear. Furthermore, the methods, systems, and devices described herein facilitate adjusting a natural frequency of the bearing device in order to prevent the natural frequency from matching a forcing frequency of the apparatus. Furthermore, a useful life of the bearing device is increased when compared to other bearing devices that do not include vibration damping capabilities. The disclosure is described as applied to exemplary embodiments, namely, methods, systems, and devices for coupling a position feedback device to a control valve associated with a steam turbine. However, it is contemplated that this disclosure has general application to position indication devices associated with any suitable apparatus.

Technical effects of the methods, systems, and devices described herein include at least one of: (a) configuring a grommet and a bearing housing such that a bearing housing opening and a grommet opening align to define a single stud opening, wherein a cantilevered stud is configured to extend through the single stud opening; and (b) configuring a cooperating member and the cantilevered stud to apply a compression force on the grommet.

Figure 1:
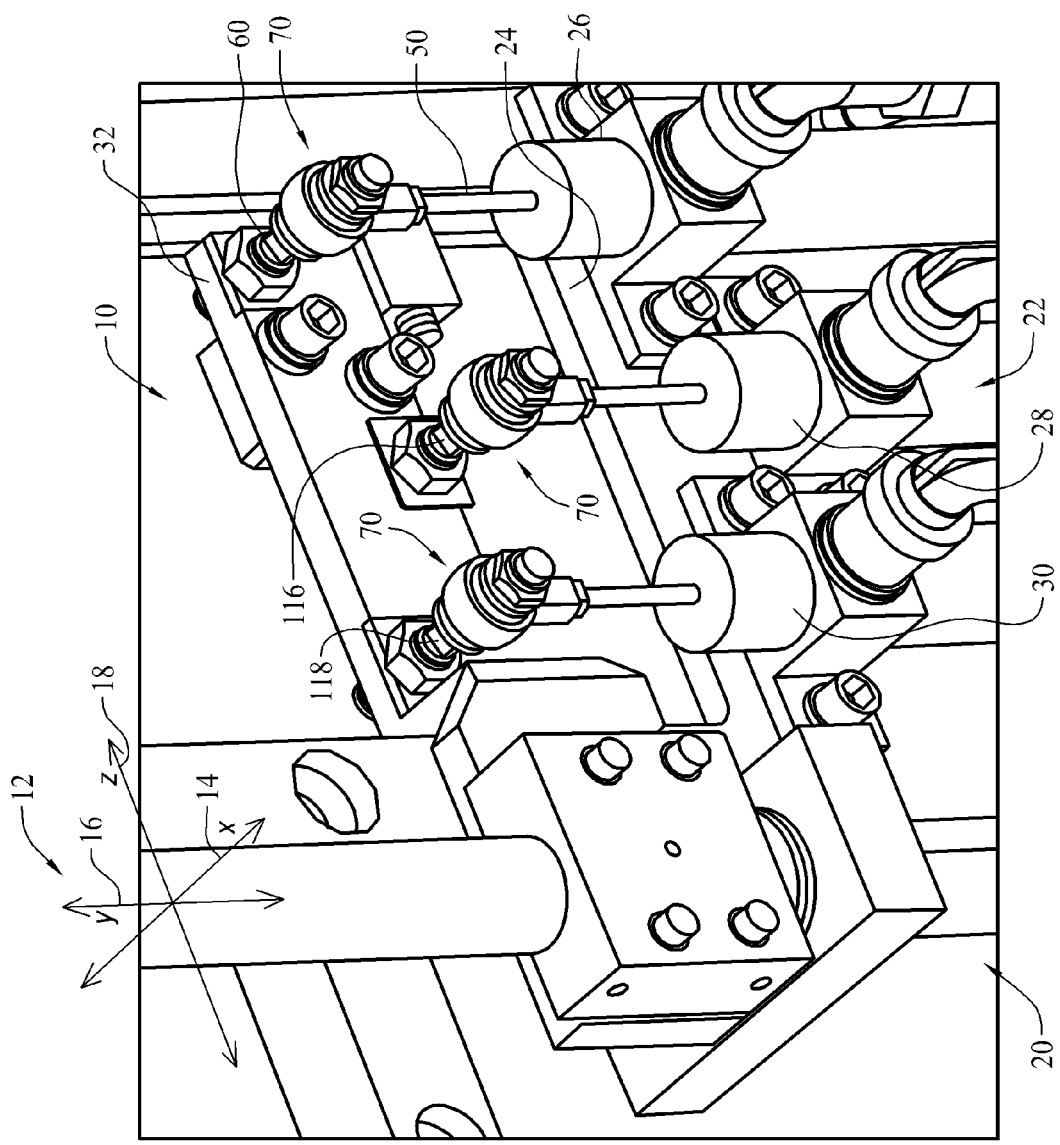
FIG. 1 is an illustration of a position indication system that includes an exemplary bearing device.

FIG. 1 is an illustration of an exemplary position indication system 10. A Cartesian coordinate system 12 including an X-axis 14, a Y-axis 16, and a Z-axis 18 is provided for use in describing position indication system 10. In the exemplary embodiment, position indication system 10 is included within a steam turbine for measuring a position of a steam valve 20. In the exemplary embodiment, position indication system 10 includes a plurality of position indication devices 22 coupled to a control valve housing 24. For example, the plurality of position indication devices 22 may include a first position indication device 26, a second position indication device 28, and a third position indication device 30. Position indication devices 26, 28, and 30 may include, for example, a linear variable differential transformer (LVDT), a rotary variable differential transformer (RVDT), and/or any other displacement measuring device. In the exemplary embodiment, the plurality of position indication devices 22 are also coupled to a control valve bracket 32. Control valve bracket 32 is coupled to steam valve 20. In the exemplary embodiment, control valve bracket 32 translates along Y-axis 16 as steam valve 20 is actuated between an open and a closed position. Although described herein as included within a steam turbine, position indication system 10 may be included within any system and/or device for measuring a position of a component within the system and/or device.

In the exemplary embodiment, first position indication device 26 includes a connecting member, for example, a first linear transducer rod 50. In the exemplary embodiment, first linear transducer rod 50 extends from first position indication device 26 in a direction parallel to Y-axis 16. Control valve bracket 32 includes a connecting member, for example, a first stud 60. In the exemplary embodiment, first stud 60 extends from control valve bracket 32 in a direction parallel to X-axis 14. In the exemplary embodiment, position indication system 10 includes a bearing device 70 for coupling first linear transducer rod 50 to first stud 60.

Figure 2:
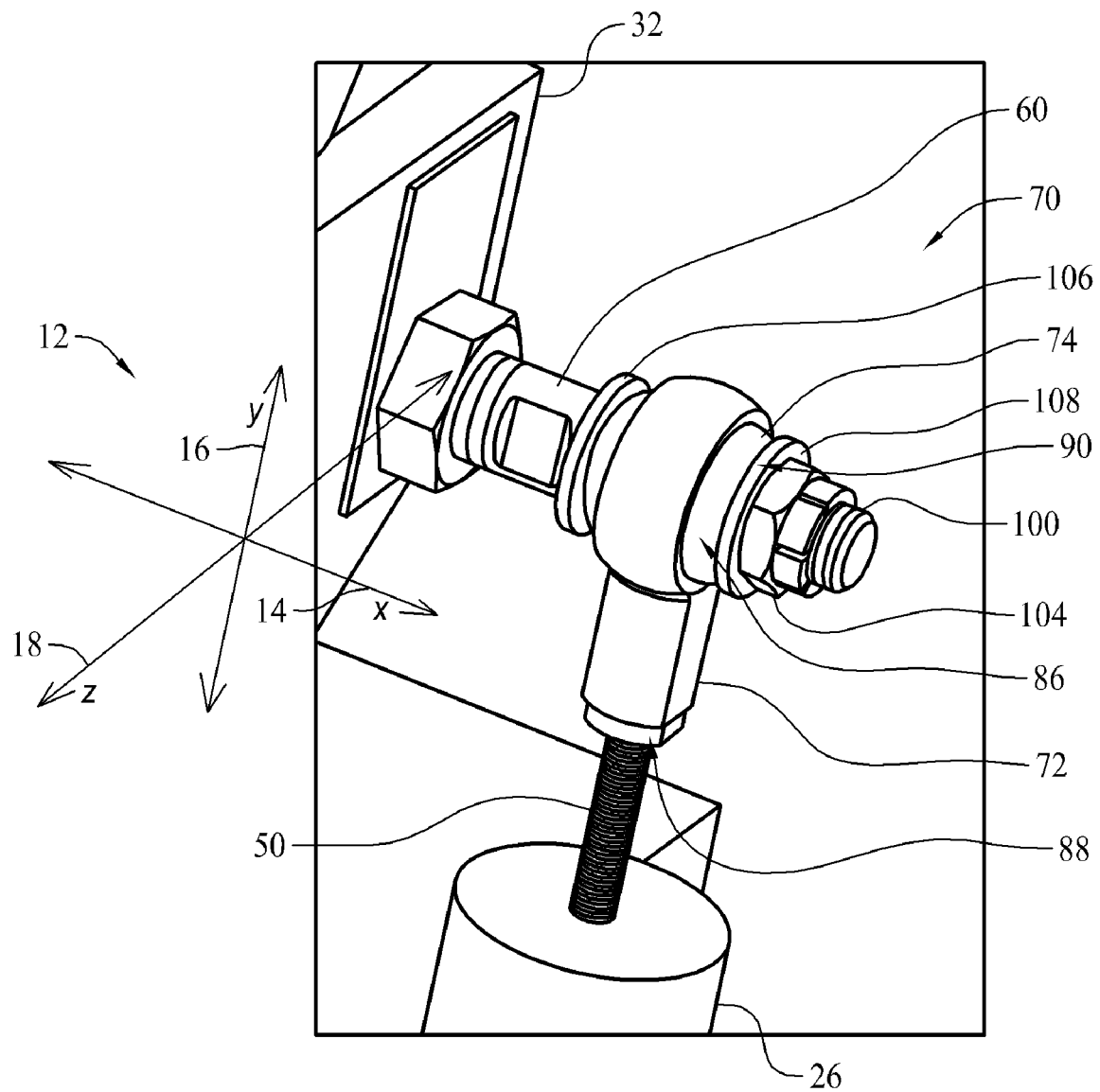
FIG. 2 is an illustration of the bearing device shown in FIG. 1.
Figure 3:
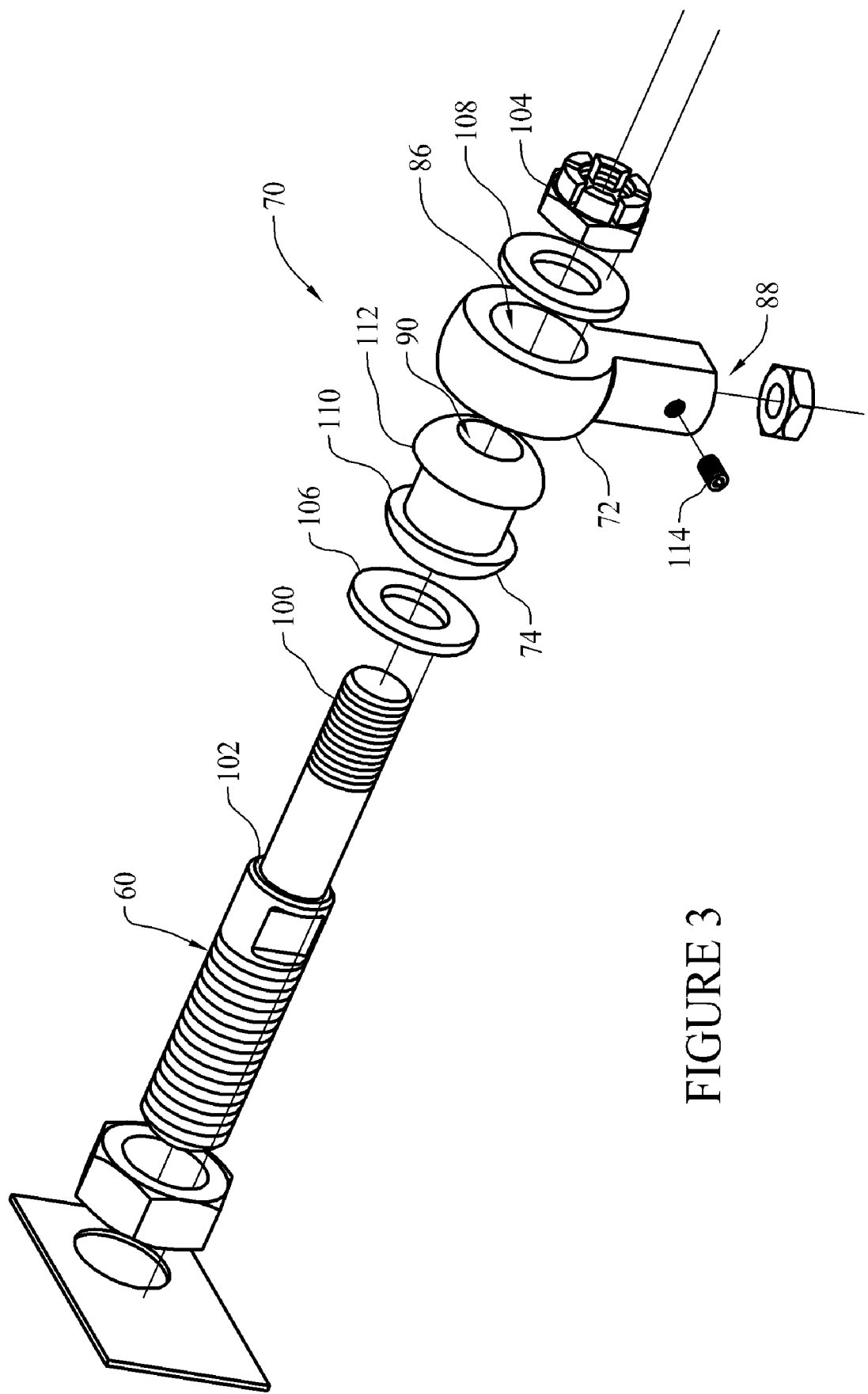
FIG. 3 is an exploded view of the bearing device shown in FIG. 1.

FIG. 2 is another illustration of bearing device 70. FIG. 3 is an exploded view of bearing device 70. As described above, bearing device 70 may be used with position indication system 10 (shown in FIG. 1). In the exemplary embodiment, bearing device 70 couples a position indication device, for example, position indication device 26, to an apparatus, for example, control valve bracket 32. In the exemplary embodiment, bearing device 70 includes a bearing housing 72 and a grommet 74. Bearing housing 72 includes a first opening 86 and a second opening 88 defined therein. Grommet 74 includes a grommet opening 90 defined therein. In the exemplary embodiment, grommet 74 is positioned within first opening 86 of bearing housing 72. First stud 60 extends through grommet opening 90. When assembled, grommet 74 is positioned between bearing housing 72 and first stud 60.

In the exemplary embodiment, first stud 60 includes a threaded portion 100 and a restraining portion 102. For example, restraining portion 102 may be in the form of a flange that extends radially outwardly from first stud 60. Alternatively, restraining portion 102 may include a pin (not shown) that extends radially through, and outward from, first stud 60. In addition, restraining portion 102 may also include a first washer 106, which in combination with the flange and/or pin, fixes the position of grommet 74 with respect to first stud 60. Furthermore, in the exemplary embodiment, threaded portion 100 is configured to extend through grommet opening 90. Moreover, a cooperating member 104, for example, in the form of a lock nut or any other suitable fastener, interacts with threaded portion 100 of first stud 60 to secure bearing device 70 to first stud 60.

In the exemplary embodiment, grommet 74 is positioned between restraining portion 102 and cooperating member 104. In some embodiments, bearing device 70 may also include a second washer 108, positioned between cooperating member 104 and grommet 74. Torque applied to at least one of cooperating member 104 and first stud 60 is converted to a compression force on grommet 74. The compression force acts on grommet 74 in a direction parallel to X-axis 14. Varying the compression force applied to grommet 74 facilitates controlling a natural frequency of bearing device 70. Issues may arise if the natural frequency of bearing device 70 is substantially similar to a forced frequency applied to bearing device 70 by, for example, control valve 20 and/or control valve housing 24. If the natural frequency of bearing device 70 matches the forced frequency, resonance may increase vibrations within position indication system 10, which may increase wear on component within system 10. Furthermore, grommet 74 may include a first shoulder 110 to prevent bearing housing 72 from contacting restraining portion 102 and/or a second shoulder 112 to prevent bearing housing 72 from contacting either second washer 108 or cooperating member 104. Alternatively, grommet 74 may be a smooth, shoulder-less grommet. The compression force acting on grommet 74 will cause expansion of the grommet between bearing housing 72 and first stud 60 radially outward from X-axis 14, which will also prevent bearing housing 72 from first stud 60.

In the exemplary embodiment, first linear transducer rod 50 is inserted into second opening 88 to couple first linear transducer rod 50 to bearing housing 72. First linear transducer rod 50 may be threaded and configured to couple with cooperating threads (not shown) included within second opening 88. Alternatively, bearing housing 72 may include a set-screw 114 for securing linear transducer rod 50 within second opening 88. Furthermore, first linear transducer rod 50 may be coupled to bearing housing 72 in any suitable manner. In the exemplary embodiment, first stud 60 is configured to provide adjustability of a position of bearing housing 72 in a direction parallel to X-axis 14. Bearing housing 72 is adjusted in a direction parallel to X-axis 14 such that second opening 88 is properly aligned with transducer rod 50. Proper alignment of transducer rod 50 and second opening 88 allows transducer rod 50 to freely move in a direction parallel to Y-axis 16.

Furthermore, in the exemplary embodiment, in addition to first position indication device 26 and first stud 60, position indication system 10 also includes second position indication device 28, third position indication device 30, and a plurality of bearing devices 70. Control valve bracket 32 also includes a second stud 116 and a third stud 118. For example, bearing device 70 couples second position indication device 28 to second stud 116 and another bearing device 70 couples third position indication device 30 to third stud 118.

In the exemplary embodiment, grommet 74 prevents contact between bearing housing 72 and first stud 60. In the exemplary embodiment, bearing housing 72 and first stud 60 are metal. Metal-on-metal contact in a high vibration application, such as a steam turbine valve actuator, may result in premature wear of components. In the exemplary embodiment, grommet 74 is manufactured from a polymer configured to eliminate metal-on-metal contact between bearing housing 72 and first stud 60. For example, grommet 74 may be manufactured from a fluoroelastomer, for example, but not limited to, Viton®. Viton® is a registered trademark of DuPont Performance Elastomers LLC. Furthermore, grommet 74 provides damping of vibration from first stud 60. Reducing vibration applied to first position indication device 26 increases an accuracy of measurements taken by device 26. Furthermore, flexibility provided by grommet 74 compensates for minor misalignment between transducer rod 50 and bearing housing 72. However, grommet 74 is sufficiently stiff so as to restrict rotation of bearing housing 72 about Y-axis 16 and so as to not induce noise into an output of position indication device 26. Furthermore, grommet 74 may be resistant to radiation to allow bearing device 70 to be used in a nuclear application, for example, a steam turbine included within a nuclear power generation facility. Moreover, grommet 74 may be resistant to damage from fluids present in a steam turbine application, for example, resistant to damage from a phosphate ester hydraulic fluid.

Figure 4:
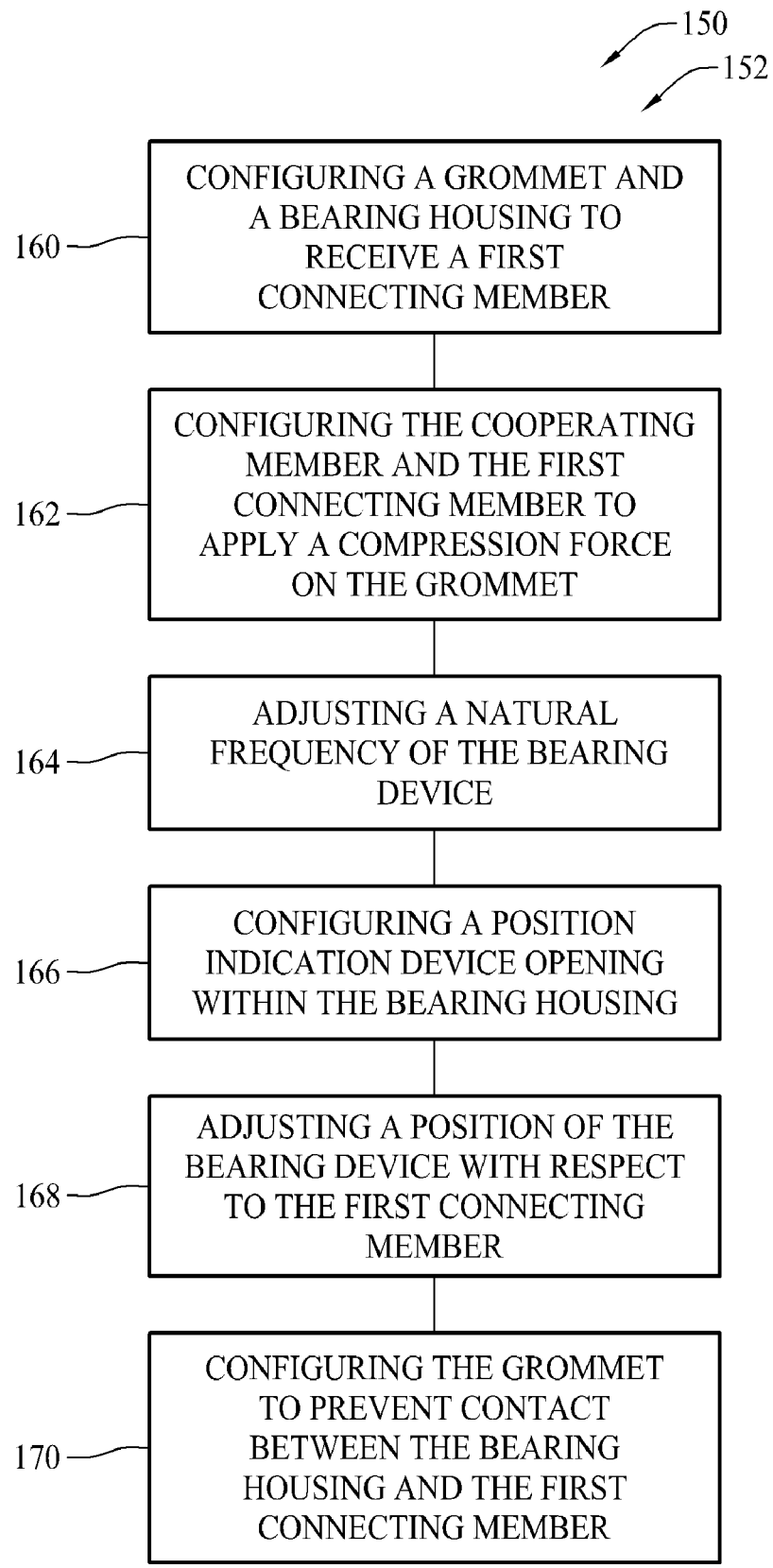
FIG. 4 is a flow chart of a method for coupling components included in the position indication system shown in FIG. 1.

FIG. 4 is a flow chart 150 of a method 152 for coupling components included in a position indication system, for example, position indication system 10 (shown in FIG. 1), and more specifically, for coupling an apparatus to a position indication device using a bearing device. As described above, in the exemplary embodiment, position indication system 10 includes bearing device 70, which includes bearing housing 72 and grommet 74 (all shown in FIG. 2). Bearing housing 72 includes a first opening 86 defined therein and grommet 74 includes a grommet opening 90 defined therein (all shown in FIG. 2). In the exemplary embodiment, method 152 includes configuring 160 grommet 74 and bearing housing 72 to receive a connecting member, for example, first stud 60. Grommet 74 is positioned between first stud 60 and bearing housing 72.

In the exemplary embodiment, method 152 also includes configuring 162 a cooperating member, for example, cooperating member 104 (shown in FIG. 2) and first stud 60 to apply a compression force on grommet 74. For example, grommet 74 is positioned between a restraining portion, for example, restraining portion 102 (shown in FIG. 2) of first stud 60 and cooperating member 104. Cooperating member 104 is configured 162 such that the compression force is applied to grommet 74 by restraining portion 102 and cooperating member 104.

In the exemplary embodiment, a durometer of grommet 74 is selected to avoid matching of a natural frequency of bearing device 70 and a forcing frequency of, for example, steam valve 20 (shown in FIG. 1). More specifically, during operation of the steam turbine, steam valve 20 is subject to vibrations having several primary frequencies. The durometer of grommet 74 is selected to avoid matching of a natural frequency of bearing device 70 and at least one of the primary frequencies in order to prevent resonance between bearing device 70 and steam valve 20. In the exemplary embodiment, method 152 may also include adjusting 164 a natural frequency of at least one of bearing device 70 and position indication device 26 by adjusting the compression force on grommet 74. For example, increasing the compression force on grommet 74 increases the natural frequency of bearing device 70, due at least in part to the increased stiffness of grommet 74 under compression. Conversely, reducing the compression force on grommet 74 decreases the natural frequency of bearing device 70. In at least one example, increasing the compression force on grommet 74 by rotating cooperating member 104 one full revolution increases the natural frequency of bearing device 70 by over one hundred hertz.

Although in the exemplary embodiment the durometer of grommet 74 is initially selected to avoid matching of the natural frequency of bearing device 70 and at least one primary frequency of steam valve 20, the adjustability of the natural frequency of bearing device 70 allows adjustments to be made, for example, if changes to the steam turbine and/or steam valve 20 result in changes to the forcing frequency of the steam valve 20. Maintaining a difference between the natural frequency of bearing device 70 and the forcing frequency of steam valve 20 reduces damage and/or wear to components of the steam turbine by preventing resonance conditions.

Furthermore, method 152 may also include configuring 166 a position indication device opening within bearing housing 72 to receive at least a portion of position indication device 26. For example, second opening 88 (shown in FIG. 2) is configured 166 to receive linear transducer rod 50 (shown in FIG. 2).

Moreover, method 152 may also include adjusting 168 a position of bearing device 70 with respect to first stud 60 in a direction parallel to X-axis 14. Adjusting 168 a position of bearing housing 72 in a direction parallel to X-axis 14 facilitates proper alignment of second opening 88 and transducer rod 50. Proper alignment of transducer rod 50 and second opening 88 allows transducer rod 50 to freely move in a direction parallel to Y-axis 16.

Moreover, method 152 may include configuring 170 grommet 74 to prevent contact between bearing housing 72 and first stud 60, dampen vibration from at least one of first stud 60 and position indication device 26, and restrict rotation of bearing housing 72.

Described herein are exemplary methods, systems, and devices for coupling an apparatus to a position indication device. More specifically, the methods, systems, and devices described herein facilitate coupling the position indication device to an apparatus using a bearing device in a manner that allows for proper alignment of the position indication device and the apparatus. Proper alignment facilitates accurate operation of the position indication device. Furthermore, the methods, systems, and devices described herein facilitate adjusting a natural frequency of the bearing device in order to prevent the natural frequency from matching a forcing frequency from the apparatus. Furthermore, a useful life of the bearing device is increased when compared to other bearing devices that do not include vibration damping capabilities.

The methods, systems, and devices described herein facilitate efficient and economical coupling of components within a position indication system. Exemplary embodiments of methods, systems, and devices are described and/or illustrated herein in detail. The methods, systems, and devices are not limited to the specific embodiments described herein, but rather, components of each system or device, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A position indication system for measuring a position of an apparatus, said system comprising:
    a bracket coupled to the apparatus;
    a first connecting member extending from said bracket;
    a position indication device comprising a second connecting member; and
    a bearing device configured to couple said first connecting member to said second connecting member, said bearing device comprising:
        a bearing housing including a first opening defined therein; and
        a grommet including a second opening defined therein, said grommet configured for positioning within the first opening, said first connecting member configured to extend through the first opening and to couple said bearing device to said bracket.

2. A system in accordance with claim 1, wherein said grommet is configured for positioning such that at least a portion of said grommet is between said bearing housing and said first connecting member.

3. A system in accordance with claim 1, wherein said first connecting member comprises a threaded portion and a restraining portion, said threaded portion configured to extend through the second opening.

4. A system in accordance with claim 3, further comprising a cooperating member, wherein said grommet is configured for positioning between said restraining portion and said cooperating member.

5. A system in accordance with claim 4, wherein said cooperating member and said first connecting member are configured to convert torque applied to said cooperating member to a compression force on said grommet.

6. A system in accordance with claim 5, wherein said bearing device is configured to provide an adjustable natural frequency based at least partially on the compression force on said grommet.

7. A system in accordance with claim 1, wherein said position indication device comprises a linear variable differential transformer, said second connecting member is a transducer rod, said linear variable differential transformer is included within a steam turbine that includes at least one steam valve and is used to determine a position of the at least one steam valve.

8. A system in accordance with claim 1, wherein said grommet is configured to:
    prevent contact between said bearing housing and said first connecting member;
    dampen vibration from at least one of said first connecting member and said second connecting member; and
    restrict rotation about an axis parallel to said second connecting member.

9. A system in accordance with claim 1, wherein said first connecting member is configured to provide adjustability of said bearing device in a first direction, wherein the first direction is along an axis parallel to a length of said first connecting member.

10. A bearing device for coupling a position indication device to an apparatus for measuring a position of the apparatus, the apparatus comprising a first connecting member, said bearing device comprising:
    a bearing housing including a first opening defined therein configured to receive the first connecting member and a second opening defined therein configured to receive at least a portion of the position indication device; and
    a grommet configured for positioning within the first opening and for positioning around the first connecting member.

11. A bearing device in accordance with claim 10, wherein said grommet is configured for positioning such that at least a portion of said grommet is between said bearing housing and the first connecting member to prevent contact between said bearing housing and the first connecting member.

12. A bearing device in accordance with claim 10, wherein said first connecting member comprises a cantilevered stud extending from a bracket coupled to the apparatus, wherein the apparatus comprises a steam valve included within a steam turbine.

13. A bearing device in accordance with claim 10, wherein said bearing device is configured to provide an adjustable natural frequency based at least partially on a level of compression force applied to said grommet.

14. A bearing device in accordance with claim 10, wherein said apparatus comprises a steam valve and said position indication device comprises a linear variable differential transformer configured for use in determining a position of said steam valve.

15. A method for coupling a bearing device to an apparatus, the apparatus including a cantilevered stud extending from a bracket coupled to the apparatus, the cantilevered stud configured to interact with a cooperating member, the bearing device including a bearing housing and a grommet, the bearing housing including a bearing housing opening defined therein and the grommet including a grommet opening defined therein, said method comprising:
    configuring the grommet and the bearing housing to receive the cantilevered stud, wherein the grommet is positioned such that at least a portion of the grommet is between the cantilevered stud and the bearing housing;
    configuring the cooperating member and the cantilevered stud to apply a compression force on the grommet;
    positioning the grommet to prevent contact between the bearing housing and the cantilevered stud, and to dampen vibration from at least one of the cantilevered stud and a position indication device coupled to the bearing device; and
    restricting rotation of the bearing housing.

16. A method in accordance with claim 15, wherein the bearing housing includes a position indication device opening, said method further comprising configuring the position indication device opening to receive at least a portion of the position indication device.

17. A method in accordance with claim 16, further comprising adjusting the position of the bearing device with respect to the cantilevered stud to align the position indication device opening with the position indication device.

18. A method in accordance with claim 15, wherein the cantilevered stud includes a restraining portion and wherein configuring the cooperating member and the cantilevered stud to apply a compression force on the grommet comprises configuring the grommet for positioning between the restraining portion and the cooperating member such that the compression force is applied to the grommet by the restraining portion and the cooperating member.

19. A method in accordance with claim 15, further comprising adjusting a natural frequency of at least one of the bearing device, the apparatus, and the position indication device by adjusting the compression force on the grommet.

* * * * *